(12) United States Patent
Ishii

(10) Patent No.: US 7,245,403 B2
(45) Date of Patent: Jul. 17, 2007

(54) IMAGE TRANSFER APPARATUS AND IMAGE TRANSFER METHOD

(75) Inventor: Toshiharu Ishii, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1220 days.

(21) Appl. No.: 10/096,903

(22) Filed: Mar. 14, 2002

(65) Prior Publication Data

US 2002/0131088 A1    Sep. 19, 2002

(30) Foreign Application Priority Data

Mar. 15, 2001    (JP)    ............................. 2001-074496

(51) Int. Cl.
*H04N 1/00*    (2006.01)
*G06F 7/00*    (2006.01)
*G06F 3/00*    (2006.01)

(52) U.S. Cl. ...................... 358/402; 358/400; 358/401; 358/1.15; 358/407; 379/93.09; 379/93.15; 379/100.01; 379/905; 709/202; 709/239

(58) Field of Classification Search ........ 358/400–402, 358/1.15, 405, 407, 1.16, 426.01, 426.05, 358/440, 451, 468; 709/206, 202, 239; 379/93.09, 379/0.15, 93.24, 905, 100.01
See application file for complete search history.

(56) References Cited

U.S. PATENT DOCUMENTS

| 5,621,894 | A  | * | 4/1997 | Menezes et al. | ............ 709/227 |
| 6,335,966 | B1 | * | 1/2002 | Toyoda | ................... 379/100.06 |
| 6,437,873 | B1 | * | 8/2002 | Maeda | ...................... 358/1.15 |
| 6,466,330 | B1 | * | 10/2002 | Mori | ......................... 358/1.15 |
| 7,103,633 | B1 | * | 9/2006 | Malik | .......................... 709/206 |

FOREIGN PATENT DOCUMENTS

JP    2000-276415    10/2000

\* cited by examiner

*Primary Examiner*—Aung S. Moe
*Assistant Examiner*—Scott Schlack
(74) *Attorney, Agent, or Firm*—Foley & Lardner LLP

(57) ABSTRACT

An image transfer apparatus includes a history information storage unit configure to store a history information by associating a mail address designated as a destination in a previously performed image transfer with type information indicating a type of the terminal of the image transfer destination. The apparatus allows a first transfer unit to execute the image transfer, when the history information stored in the history information storage unit is designated as the image transfer destination and the type information included in the designated history information indicates a first type in conformity with a Internet system, and allows a second transfer unit to execute the image transfer, when the type information included in the history information designated as the image transfer destination indicates a second type in a predetermined system not to related to the Internet system.

8 Claims, 4 Drawing Sheets

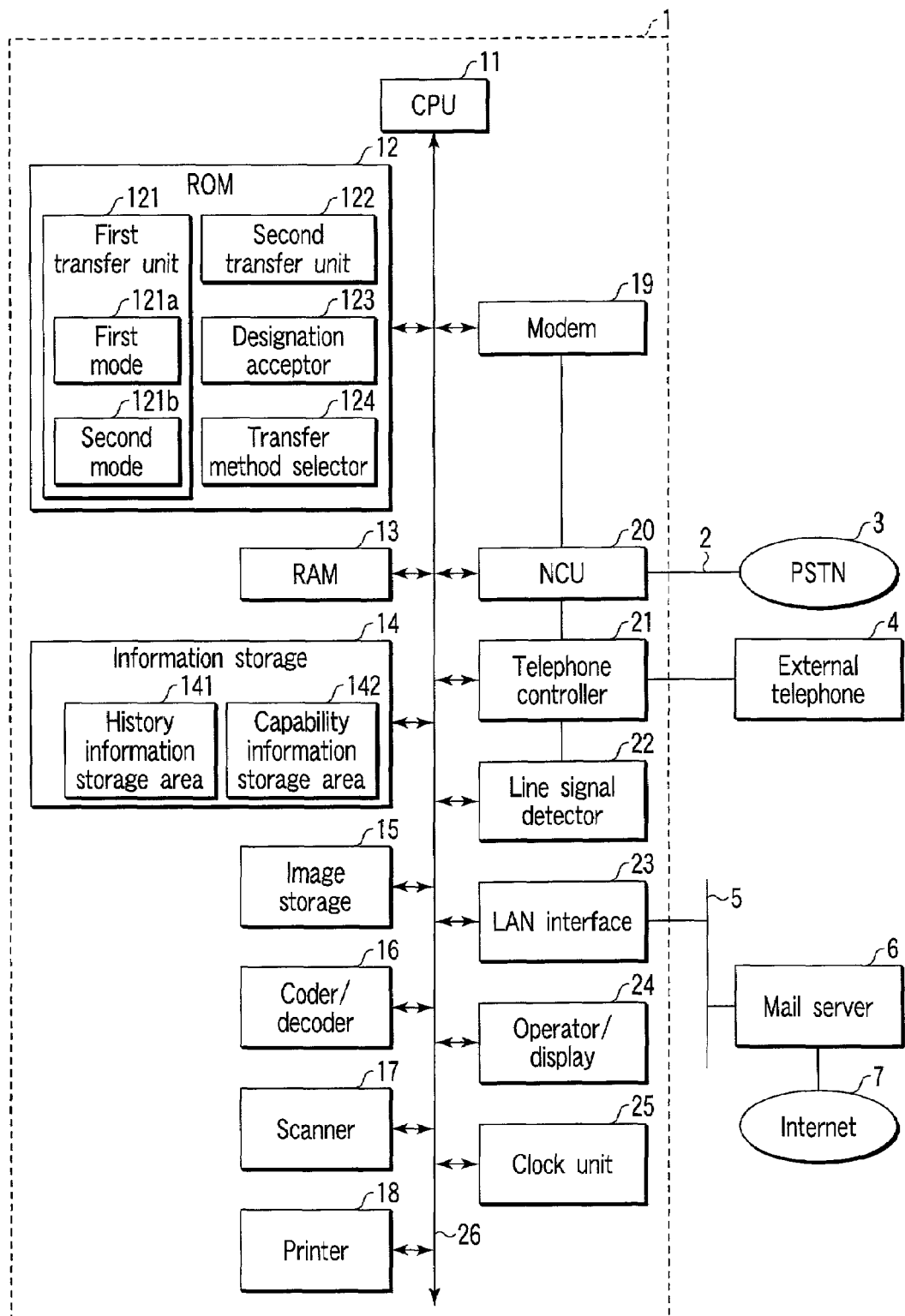
F I G. 2

| Transmission date | Mail address | Terminal type |
|---|---|---|
| 2001.01.01 00:00:00 | ○○○@○○○.co.jp | IFAX |
| 2001.01.01 09:00:30 | ×××@×××.co.jp | IFAX |
| 2001.01.02 15:42:16 | △△△@△△△.co.jp | PC |
| ⋮ | ⋮ | ⋮ |

FIG. 3

| Mail address | Capability information |
|---|---|
| ○○○@○○○.co.jp | — |
| ×××@×××.co.jp | Sheet size=A4, Resolution=600dpi, ⋯ |
| △△△@△△△.co.jp | — |
| ⋮ | ⋮ |

FIG. 4

IMAGE TRANSFER APPARATUS AND IMAGE TRANSFER METHOD

CROSS-REFERENCE TO RELATED APPLICATIONS

This application is based upon and claims the benefit of priority from the prior Japanese Patent Application No. 2001-074496, filed Mar. 15, 2001, the entire contents of which are incorporated herein by reference.

BACKGROUND OF THE INVENTION

1. Field of the Invention

The present invention relates to an image transfer apparatus which has, for example, a function of transferring an image obtained by reading an original by a scanner to another Internet facsimile terminal via a network in a predetermined Internet facsimile system, and a function of transferring an electronic mail with the image attached thereto to an arbitrary terminal such as another computer terminal via the network irrespective of the Internet facsimile system.

2. Description of the Related Art

A digital complex machine is general which uses a public switched telephone network (PSTN) or an integrated services digital network (ISDN) as a method of communication of an image with a remote area. This type of the digital complex machine is easy to operate and can transmit a message even in the absence of a receiving person. Therefore, the machine is broadly spread not only in a business field but also in a household. A communication standard of a facsimile using the PSTN or ISDN is standardized/recommended as a G3 facsimile or a G4 facsimile by International Telecommunication Union (ITU).

Such facsimile has advantages that a communication circuit is directly secured with a facsimile on a reception side and thereby data can be transferred at a highest communication speed allowed in a band width of the communication circuit. It can be checked that the data is securely transmitted by the direct communication with the destination. Moreover, a capability negotiation is performed so as to check whether a form of the data to be transmitted is allowable for the reception side, and the data can securely be transmitted.

On the other hand, with generalization of Internet, a service has become popular which uses Internet instead of a conventional circuit exchange network.

Particularly when a transmission distance or a data amount is large, a communication cost can be minimized with the transmission via Internet. Therefore, there has been provided an Internet digital complex machine which has a function of transmitting/receiving an image via Internet in addition to the function of a usual digital complex machine.

Moreover, this type of Internet digital complex machine generally transmits image data as an attached file of the electronic mail on Internet. Therefore, since the image data is transferred in a connectionless manner, the negotiation performed by the G3 or G4 facsimile cannot be performed. In a used communication mode, a transmission side sends the image in a one-sided manner.

In the Internet facsimile system using this communication mode, the electronic mail is usually used to transfer the image. Therefore, even when the terminal of the transmission destination is not an Internet facsimile terminal, but when the terminal has a function of receiving the electronic mail, even computer terminals such as a personal computer can receive an image transfer. That is, a function of a network scanner for transferring the image obtained by reading the original to another computer terminal can also be easily disposed.

However, when the terminal has both the functions of the image transfers as the Internet facsimile and as the network scanner, and when the image is transferred, a user has to designate whether a transfer destination is an Internet facsimile terminal or a computer terminal. Therefore, convenience for use by the user is deteriorated.

BRIEF SUMMARY OF THE INVENTION

An object of the present invention is to provide an image transfer apparatus and an image transfer method in which an appropriate condition for transferring an image is automatically determined, the image is automatically transferred on the condition, and user's convenience for use can be enhanced.

According to one aspect of the present invention, there is provided an image transfer apparatus which uses an electronic mail to transfer an image to a first type of a terminal conforming to a predetermined Internet system and a second type of a terminal not conforming to the Internet system, and which comprises: a first transfer unit configured to transfer the image in conformity with the Internet system; a second transfer unit configured to transfer the image in a predetermined system not related with the Internet system; a history information storage unit configured to store history information composed by associating a mail address designated as a destination in a previously performed image transfer with type information indicating the type of the terminal of the image transfer destination; and a transfer method selection unit configured to allow the first transfer unit to execute the image transfer, when the history information stored in the history information storage unit is designated as the image transfer destination and the type information included in the designated history information indicates the first type, and to allow the second transfer unit to execute the image transfer, when the type information included in the history information designated as the image transfer destination indicates the second type.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and comprise a part of the specification, illustrate embodiments of the invention, and together with the general description given above and the detailed description of the embodiments given below, serve to explain the principles of the invention.

FIG. 2 is a block diagram showing a main part construction of the digital complex machine;

FIG. 3 is a diagram showing one example of stored data of a history information storage area;

FIG. 4 is a diagram showing one example of stored data of a capability information storage area.

DETAILED DESCRIPTION OF THE INVENTION

One embodiment of the present invention will be described hereinafter with reference to the drawings.

Figure 1:
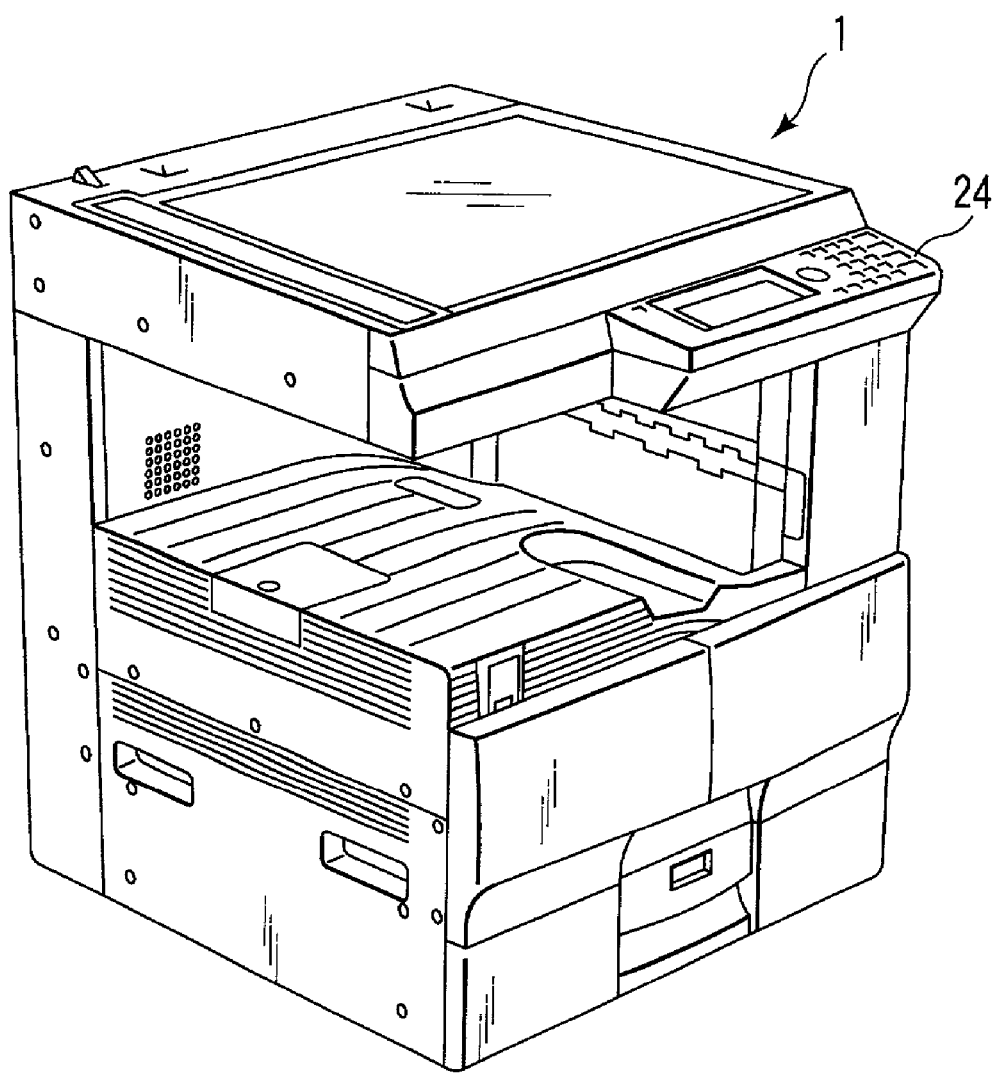
FIG. 1 is a perspective view showing an appearance of a digital complex machine composed by applying an image transfer apparatus in one embodiment of the present invention.

FIG. 1 is a view showing an appearance of a digital complex machine 1, and FIG. 2 is a block diagram showing a main part construction of the digital complex machine 1.

The main part construction of the digital complex machine 1 includes a CPU 11, ROM 12, RAM 13, information storage 14, image storage 15, coder/decoder 16, scanner 17, printer 18, modem 19, NCU 20, telephone controller 21, line signal detector 22, LAN interface 23, operator/display 24, and clock unit 25.

The CPU 11, ROM 12, RAM 13, information storage 14, image storage 15, coder/decoder 16, scanner 17, printer 18, modem 19, NCU 20, line signal detector 22, LAN interface 23, operator/display 24, and clock unit 25 are connected to one another via a system bus 26. Moreover, the NCU 20 is connected to the modem 19 and telephone controller 21, and the telephone controller 21 is connected to the line signal detector 22.

The CPU 11 performs a control processing for collectively controlling respective components based on a control program stored in the ROM 12 and thereby realizes an operation of the digital complex machine 1.

The ROM 12 stores the control program of the CPU 11.

The RAM 13 is used as a work area for storing various information necessary for the CPU 11 to perform various processing.

The information storage 14 is composed, for example, using a flash memory, and stores various setting information and other information. A part of a storage region of the information storage 14 includes a history information storage area 141 for storing history information and a capability information storage area 142 for storing capability information.

The history information storage area 141 stores the history information regarding the previously performed image transmission. For example, as shown in FIG. 3, a transmission date, a mail address of a transmission destination, and a terminal type of the transmission destination are associated with one another and stored. Additionally, the terminal type is an Internet facsimile terminal as a first type or a personal computer terminal (PC) as a second type.

In the capability information storage area 142, for example, as shown in FIG. 4, the information is associated with the mail address, and capability information of the terminal corresponding to the mail address is stored.

The image storage 15 is composed, for example, using a large-capacity DRAM, hard disk drive, and the like, and temporarily stores the received image data or the image data to be transmitted.

The encoder/decoder 16 subjects the image data to a coding processing to compress redundancy, and decodes the image data coded to compress the redundancy.

The scanner 17 reads an original conveyed from an original stand through a sheet passing path (not shown), and generates the image data indicating the transmission original.

The printer 18 prints the image indicated by the image data onto a recording sheet.

The modem 19 modulates the image data to generate a facsimile transmission signal, modulates a command given from the CPU 11 to generate a command transmission signal, and transmits these transmission signals to a PSTN subscriber line 2 via the NCU 20. Moreover, the modem 19 demodulates the facsimile transmission data given via the PSTN subscriber line 2 and NCU 20 to reproduce the image data, and demodulates the command transmission signal to reproduce the command.

The NCU 20 is connected to the PSTN subscriber line 2 contained in a PSTN 3. The connected PSTN subscriber line 2 is subjected to a state monitoring and transmission processing to a network. Moreover, the NCU 20 equalizes the facsimile transmission signal to be transmitted via the PSTN subscriber line 2, and sets a level.

The telephone controller 21 is connected to an external telephone 4 as the occasion demands. Moreover, the telephone controller 21 uses the connected external telephone 4 to perform a known control processing so that communication via the PSTN subscriber line 2 is performed.

The line signal detector 22 receives the signal via the PSTN subscriber line 2, NCU 20, and telephone controller 21, and detects arrival of a predetermined signal.

The LAN interface 23 is connected to Internet 7 via a LAN line 5 and mail server 6. Moreover, the LAN interface 23 transmits the data via the LAN line 5 or Internet 7.

The operator/display 24 includes a key input unit for receiving various instruction inputs for the CPU 11 by the user, a display for displaying various information to be notified to the user under the control of the CPU 11, and the like.

The clock unit 25 constantly performs a time counting operation, and outputs present time information indicating the present time.

In the digital complex machine 1 composed as described above, examples of the control program stored in the ROM 12 and executed by the CPU 11 include: a general program in the digital complex machine, such as a control program for transferring the image in a simple mode. Additionally, a control program for performing a first image transfer is stored in a first transfer unit 121; a control program for performing a second image transfer is stored in a second transfer unit 122; a control program for controlling the input from the operator/display 24 is stored in a designation acceptor 123; and a control program for selecting a transfer method is stored in a transfer method selector 124.

In the simple mode, a file form of the image data is a TIFF form, resolution is "fine" or "standard", size is A4, and compression system is MH. In the mode, the image transfer is possible only on the conditions predetermined in this manner. An electronic mail including the image data in conformity with the predetermined conditions is transferred to a reception side from a transmission side. A function of processing the image data in conformity with the predetermined conditions is essential for an Internet facsimile terminal, and the Internet facsimile terminal having received the image data transferred in the simple mode can securely process the image data. Therefore, in the simple mode, only completely one-directional communication to the reception side from the transmission side is performed, and various notices are not performed at all.

The image transfer executed by the control program stored in the first transfer unit 121 is performed in a full mode. In the full mode, the conditions of the image to be transferred are not limited, and the resolution, image quality (white and black, monochrome multi-gradation, color, and the like), size, and compression system can arbitrarily be selected. However, similarly as the simple mode, the negotiation as in the G3 or G4 facsimile is not performed even in the full mode. Therefore, the conditions of the image to be transferred are determined by the transmission side. In the full mode, the reception side cannot process the transferred image data in some case. In this case, a communication error occurs. In order to avoid the error in the full mode, there are: a first mode which conforms to an Internet facsimile system and in which the image transfer is performed with a notice request of the capability information; and a second mode which conforms to the Internet facsimile system and in which the image transfer is performed without any notice request of the capability information. For the notice request of the capability information, for example, the terminal on the image reception side is requested to return an electronic mail including a reception result and the capability information indicating a capability of the terminal to the terminal on the image transmission side. In this case, an appropriate measure can be taken thereafter based on the information of the electronic mail on the image transmission side.

For the control program stored in the second transfer unit 122, the image is transferred to the computer terminal irrespective of the Internet facsimile system.

For the control program stored in the designation acceptor 123, user designation of a condition relating to acquisition of the capability information is accepted.

For the control program stored in the transfer method selector 124, when the history information stored in the history information storage area 141 is designated and the image transfer is requested, a transmission method is selected in consideration of the terminal type included in the designated history information and the condition accepted by the designation acceptor 123.

An operation of the digital complex machine 1 composed as described above will next be described. Additionally, the digital complex machine 1 also has a photocopy function, print function, or G3 facsimile function. However, since the operation for realizing these functions is similar to the operation of a conventional digital complex machine, description thereof is omitted. Here, an operation relating to the image transfer for the Internet facsimile transmission function and network scanner function will be described in detail.

First, when the user designates the communication condition and the image transfer is performed, and terminal type of the destination terminal relating to the image transfer are stored in the history information storage area 141 of the information storage 14.

Figure 5:
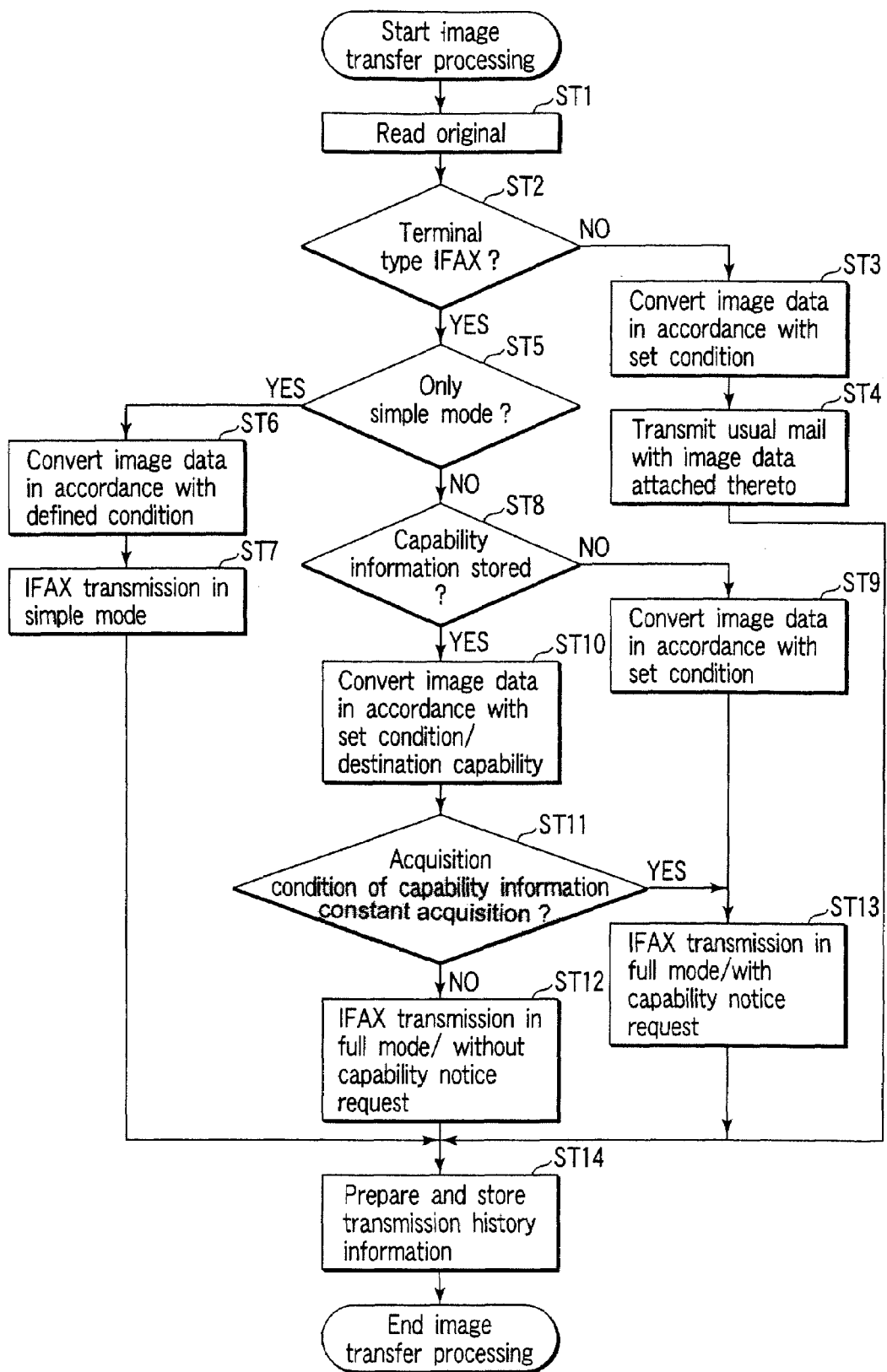
FIG. 5 is a flowchart showing a processing procedure during an image transfer processing.

While the history information is stored in the history information storage area 141 of the information storage 14, the CPU 11 accepts the designation of the history information as new designation of the destination of the image transfer. Moreover, when the history information is designated as the designation of the destination of the image transfer, the CPU 11 starts an image transfer processing as shown in FIG. 5.

In the image transfer processing, the CPU 11 first allows the scanner 17 to read an original (step ST1). Additionally, the image data generated by the scanner 17 is stored in the image storage 15.

Subsequently, the CPU 11 checks the terminal type indicated by the designated history information, that is, judges whether or not the type of the present image transfer destination terminal is an Internet facsimile (step ST2). Here, when the corresponding terminal type is not the Internet facsimile, the CPU 11 judges that the present destination is a personal computer terminal. Moreover, the image data obtained in the step ST1 is converted and adapted to the condition separately set by the user for the present image transfer (or a default condition, when the condition is not set) (step ST3). A usual electronic mail with the converted image data attached thereto is transmitted (step ST4).

On the other hand, it is confirmed in the step ST2 that the corresponding terminal type is the Internet facsimile, that is, that the present destination is the Internet facsimile terminal. Then, the CPU 11 judges whether or not the terminal of the present destination handles only the simple mode (step ST5). Additionally, the judgment can be made based on the separate user designation or a result of automatic judgment in the previous image transfer.

When the terminal of the present destination obviously handles only the simple mode, the CPU 11 converts the image data obtained in the step ST1 so as to meet the condition defined beforehand in the simple mode (step ST6), and transmits the converted image data in the simple mode via Internet facsimile (step ST7).

Additionally, it is clear that the terminal of the present destination also handles the full mode, or it is unclear whether or not the terminal handles the full mode. In this case, the CPU 11 judges in the step ST5 that the terminal of the present destination does not handle only the simple mode. Moreover, in this case, the CPU 11 subsequently judges whether or not the capability information is associated with the mail address indicated in the designated history information and stored in the capability information storage area 142 of the information storage 14 (step ST8). Here, when the corresponding capability information is not stored, the image data obtained in the step ST1 is converted and suited to the condition separately set by the user for the present image transfer (or the default condition, when the condition is not set) (step ST9).

However, it is judged in the step ST8 that the corresponding capability information is stored. Then, the CPU 11 converts the image data obtained in the step ST1 so as to meet the condition separately set by the user for the present image transfer (or the default condition, when the condition is not set) and the destination capability indicated by the capability information associated with the mail address (step ST10). Subsequently, the CPU 11 judges whether or not constant acquisition is set as the acquisition condition of the capability information (step ST11). Additionally, the acquisition condition of the capability information is a setting which is common to all image transfers, and the user can arbitrarily select whether or not to perform the constant acquisition. Moreover, the CPU 11 accepts the designation of the acquisition condition of the capability information performed by the user at an arbitrary timing, and for example, stores management information beforehand in the information storage 14. In the setting of the constant acquisition, even when the capability information of the destination terminal is or is not stored in the capability information storage area 142 of the information storage 14, an attempt is constantly made to acquire the capability information. Conversely, in the setting in which the constant acquisition is not performed, an attempt is made to acquire the capability information, only when the capability information of the destination terminal is not stored in the capability information storage area 142 of the information storage 14.

Then, the CPU 11 judges in the step ST11 that the constant acquisition is not set as the acquisition condition of the capability information, and transmits the image data converted in the step ST10 in the full mode without any capability notice request via the Internet facsimile (step ST12). However, the CPU 11 judges in the step ST11 that the constant acquisition is set as the acquisition condition of the capability information, and judges in the step ST8 that the corresponding capability information is not stored in the capability information storage area 142 of the information storage 14. In this case, the CPU 11 transmits the image data converted in the step ST10 or ST9 in the full mode with the capability notice request via the Internet facsimile (step ST13).

Moreover, after the image transfer in the step ST4, ST7, ST12, or ST13, the CPU 11 prepares the history information regarding the present image transfer, and stores the history information in the history information storage area 141 of the information storage 14. Subsequently, the CPU 11 thereby ends the present image transfer processing.

Additionally, when the Internet facsimile transmission is performed in the full mode with the capability notice request as described above, and when the destination is the Internet facsimile terminal for the full mode, the electronic mail of capability/acknowledgement is returned from the terminal. Then, on receiving the electronic mail of capability/acknowledgement, the CPU 11 extracts the capability information from the electronic mail, and stores the information in the capability information storage area 142 of the information storage 14. In this manner, the capability information of the destination is acquired, and used in the subsequent image transfer.

As described above, according to the present embodiment, the terminal type of the destination terminal identified in the arbitrary method in the previously performed image transfer is associated with the mail address and stored as the history information. During the new image transfer, it is possible to designate the mail address included in the history information as the destination by the designation of the history information. Moreover, the acquisition condition of the capability information, that is, the user designation indicating that the capability information is constantly acquired regardless of the capability information of the destination terminal stored/not-stored in the ability information storage area 142 of the information storage 14 or that the capability information is acquired only with the capability information of the destination terminal stored in the capability information storage area 142 of the information storage 14 is accepted.

Moreover, when the destination is designated by the designation of the history information, it can automatically be judged from the terminal type included in the designated history information that the destination terminal is the Internet facsimile or the personal computer.

Furthermore, the condition of the image transfer is automatically determined based on the history information and the acquisition condition of the capability information, and the image transfer can be performed on the determined condition.

Therefore, when the user sets the acquisition condition of the capability information beforehand, it is unnecessary to set detailed condition of the image transfer to the same destination as that of the previous image transfer for each image transfer. Therefore, a user's burden is reduced, and user's convenience in use is enhanced.

Additionally, the present invention is not limited to the above-described embodiment. For example, in the embodiment, the full mode without any capability notice request is used as the second mode. However, other modes in which the capability notice request is not performed, such as the simple mode, may also be set as the second mode.

Moreover, in the embodiment, the present invention is applied to the digital complex machine in an example. However, other modes of apparatuses such as an apparatus which has only the function of image transfer can also be realized.

Furthermore, in the embodiment, the Internet facsimile system defined by ITU-T is used, but the present invention can also be applied to the use of other Internet facsimile systems such as an independently determined system.

Additionally, in the embodiment, it can be set whether or not to perform the constant acquisition as the condition for acquiring the capability information. However, other conditions can also be employed. For example, for each predetermined period, it can be set whether or not to acquire the capability information if any.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image transfer apparatus which uses an electronic mail to transfer an image to a first type of a terminal conforming to a predetermined Internet system and a second type of a terminal not conforming to said Internet system, said apparatus comprising:
    a first transfer unit configured to transfer the image in conformity with said Internet system;
    a second transfer unit configured to transfer the image in a predetermined system not related to said Internet system;
    a history information storage unit configured to store history information composed by associating a mail address designated as a destination in a previously performed image transfer with type information indicating the type of the terminal of the image transfer destination;
    a transfer method selection unit configured to allow said first transfer unit to execute the image transfer, when said history information stored in said history information storage unit is designated as the image transfer destination, and said type information included in the designated history information indicates said first type, and to allow said second transfer unit to execute the image transfer, when said type information included in the history information designated as the image transfer destination indicates said second type;
    a capability information storage unit configured to associate and store predetermined capability information with the mail address to which said image transfer has been performed; and
    a designation acceptance unit configured to accept a designation of a condition to acquire said capability information,
    wherein said first transfer unit performs the image transfer in either a first mode in which a terminal of the image transfer destination is requested to notify the predetermined capability information or a second mode in which the terminal of the image transfer destination is not requested to notify said capability information,
    wherein said transfer method selection unit allows said first transfer unit:
        to perform the image transfer in a first mode, when said type information indicates the first type and the condition accepted by said designation acceptance unit is established, and to perform the image transfer in a second mode, when said type information indicates the first type and the condition accepted by said designation acceptance unit is not established, and wherein said transfer method selection unit:

judges whether or not the condition to acquire said capability information accepted by said designation acceptance unit is a constant acquisition, when said first transfer unit performs the image transfer in said second mode, allows said first transfer unit to perform the image transfer in the first mode, when the condition is judged to be the constant acquisition, and allows said first transfer unit to perform the image transfer in the second mode, when the condition is judged not to be the constant acquisition.

2. The image transfer apparatus according to claim 1, wherein the first mode is a full mode in which the notification of the capability information is requested, and the notification is requested via the electronic mail.

3. The image transfer apparatus according to claim 2, wherein the second mode is a full mode in which the notification of the capability information is not requested.

4. The image transfer apparatus according to claim 2, wherein the second mode is a simple mode.

5. An image transfer method in which an electronic mail is used to transfer a stored image to a first type of a terminal conforming to a predetermined Internet system and a second type of a terminal not conforming to said Internet system from an image transfer apparatus with the predetermined image stored therein, said method comprising:

accepting a mail address of a transfer destination by said image transfer apparatus;

judging by said image transfer apparatus whether the image transfer destination is the first type or the second type from a history information storage unit in which the mail address designated as the image transfer destination in a previously performed image transfer and type information indicating a terminal type of the image transfer destination are stored as history information;

transferring the image to the mail address accepted in a system conforming to said Internet system, when the first type is judged in the judgment, and transferring the image to the mail address accepted in a system not conforming to said Internet system, when the second type is judged in said judgment;

storing predetermined capability information associated with the mail address to which said image transfer has been performed in a capability information storage unit;

accepting a designation of a condition to acquire the capability information of the image transfer destination to which the image transfer is to be performed by a designation acceptance unit;

performing the image transfer conforming to said Internet system in a first mode to request notification of the predetermined capability information of a terminal of the image transfer destination, when the first type is judged in said judgment and a capability read from the capability information storage unit for storing the capability information associated with said mail address satisfies the condition accepted by said designation acceptance unit, or performing the image transfer conforming to said Internet system in a second mode to request no notification of said capability information of the terminal of the image transfer destination, when the first type is judged in said judgment and the capability does not satisfy the condition accepted by said designation acceptance unit;

judging whether or not the condition to acquire said capability information accepted by said designation acceptance unit is a constant acquisition, when said first transfer unit performs the image transfer in said second mode;

allowing said first transfer unit to perform the image transfer in the first mode, when the condition is judged to be the constant acquisition; and allowing said first transfer unit to perform the image transfer in the second mode, when the condition is judged not to be the constant acquisition.

6. The image transfer method according to claim 5, wherein the first mode is a full mode in which the notification of the capability information is requested, and the notification is requested via the electronic mail.

7. The image transfer method according to claim 6, wherein the second mode is a full mode in which the notification of the capability information is not requested.

8. The image transfer method according to claim 6, wherein the second mode is a simple mode.

* * * * *